Figure 1:
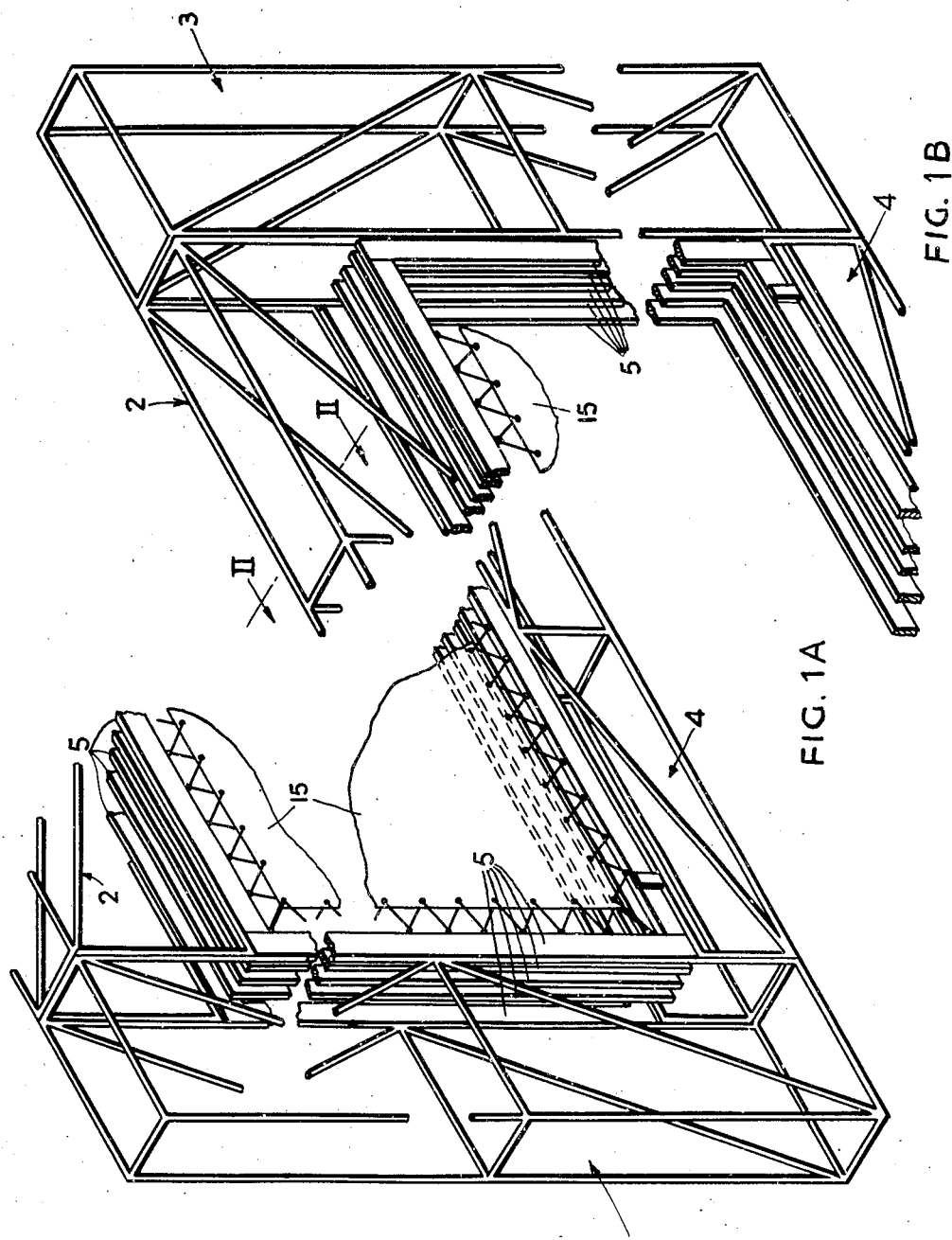

Oct. 25, 1949.　　　M. A. RENISON　　　2,486,206
PROJECTION SCREEN
Filed July 31, 1946　　　3 Sheets-Sheet 1

Oct. 25, 1949. M. A. RENISON 2,486,206
PROJECTION SCREEN
Filed July 31, 1946 3 Sheets-Sheet 3

Mathew Andrew Renison
by Peck & Peck
Attorneys.

Patented Oct. 25, 1949

2,486,206

UNITED STATES PATENT OFFICE 2,486,206

PROJECTION SCREEN

Matthew A. Renison, London, England, assignor to himself and Charles Mitchell, London, England Application July 31, 1946, Serial No. 687,240
In Great Britain August 3, 1945

3 Claims. (Cl. 88—28.9)

This invention relates to projection screens and is concerned with composite screens of the kind comprising a plurality of screen surfaces arranged in parallel relation but spaced apart in the direction of their thickness, the screen surface or surfaces nearer to the projector having both light-reflecting and light-transmitting properties, so as to produce the illusion of depth of stereoscopicity in the pictures projected on to the screen.

It is the object of the invention to provide an improved composite screen of this kind which shall enable a better effect to be obtained than has hitherto been possible.

According to the invention a composite projection screen of the kind referred to comprises a translucent front screen surface composed of a close mesh fine-thread woven material that is substantially white, a second screen surface composed of a woven material of more open mesh and coarser thread than and disposed closely adjacent to the front screen surface, a third screen surface also composed of a woven material of more open mesh and coarser thread than the front screen surface and spaced from the second surface by a distance greater than that between the front and second surfaces, and a white or silvered final screen surface spaced from the third screen surface by a distance at least as great as that between the latter and the second screen surface.

The white final screen surface may be of a woven material closely resembling that employed for the third screen surface which latter may be of coarser texture than the second screen surface.

The second and third screen surfaces are coloured to a light or medium shade and to a darker shade, respectively, or vice versa, of one or other of the colours green (which is preferred), yellow, red and blue.

In some cases a screen surface resembling the third screen surface in texture but red in colour may be either substituted for the third screen surface (if this is green or some colour other than red) or interposed between it and the white final screen.

Although reference has been made above specifically to screen surfaces composed of woven material, it is to be understood that equivalent materials may be employed, such as transparent sheets carrying networks of fine lines of the appropriate colour and spacing.

In order that the invention may be clearly understood, some examples of composite screens in accordance therewith will now be described, the first being one that has given good results on a small scale.

In this example the front screen surface is of a transparent or translucent woven material of very close mesh produced from a yarn of very fine count, such as the material known as ninon. Other materials that may be used are those known as voiles and lightweight crêpe de Chine. This front surface is preferably white but it may be slightly tinted, for example, it may be a very pale pink or yellow.

Behind this screen surface is arranged a second screen surface coloured a light or medium somewhat yellowish green and composed of a woven material of a coarser type having a mesh of, say, 18 to 26 to the inch. Material of the texture of those materials known as cheesecloth, butter muslin or bandage cloth is satisfactory.

A third screen surface, spaced from the second surface by a greater distance than separates the latter from the front surface, is composed of a woven material which may be of the same texture as that of the second surface or may be of a texture and mesh intermediate those of the materials of the front and second surfaces, for example, a material known as scrim or a lightweight buckram. This third surface is coloured a dark or blue-green.

Behind the blue-green surface, but spaced rather more therefrom than the said surface is itself spaced from the second surface, is a final white screen surface. This may be of the same material as the second or third surface or, in some cases, may be of the usual type such as is normally employed for front projection at the present time. This final screen surface may, in fact, be the normally provided screen in a cinema or the like, the other screen surfaces described being supplied as a built-up unit for use in association therewith.

With a distance between projector and front screen surface of about 10 feet, the following spacings between the respective screen surfaces of the composite screen have given good results; front and second surfaces—¾" to ⅜"; second and third surfaces—¾" to 1½"; third and final surfaces—3" to 5".

A fourth screen surface of a material closely resembling that of the second and third surfaces, but coloured a medium shade of red, may be interposed between the third and final surfaces, particularly where the intensity of illumination of the composite screen is relatively high. Moreover, the second surface may then be coloured to a darker shade than the third surface which may itself be relatively light in colour. Suitable colours are then a blue-green of medium depth for the second surface and an ordinary green of lighter tone for the third surface.

Another example of a composite screen according to the invention, which is suitable for use with the projectors commonly employed in large cinemas, differs from that already described only in relatively small details. For instance, the front screen surface may be made from a silk cloth such as is used for sifting flour or fine powders. This may be of the natural colour of the silk or may be bleached. The second screen surface may be made from a material known as grit gauze or silk bolting cloth and the third, fourth (or red) and final screen surfaces may be made from butter muslin or bandage cloth.

The colours employed are, preferably, a yellowish green for the second screen surface, a bluish green for the third screen surface, a medium red for the fourth screen surface, and white or "natural" for the front and final screen surfaces.

Owing to the greater intensity of illumination available, the screen surfaces are arranged somewhat closer together than in the first example given. Suitable spacings are instanced as follows: the second surface very close to and practically in contact with the front surface; the third surface spaced from the second surface by about $\frac{3}{16}$" and the respective distances between the third, fourth and fifth surfaces each of the order of one to three inches.

Generally speaking, the intermediate screen surfaces should be made of more open mesh and lighter in colour as the intensity of illumination with which the composite screen is intended to operate is reduced. The correct arrangement may readily be determined by means of a few comparative tests.

In some cases, additional screen surfaces, of an area less than that of the main screen surfaces already described, may be interposed between adjacent main screen surfaces in order to give a greater stereoscopic effect at selected zones of the picture projected on to the composite screen. For example, relatively narrow strips of comparatively open-meshed fabric may be interposed between the main screen surface at the vertical margins and/or at the upper horizontal margin thereof. Alternatively, one or more of the intermediate main screen surfaces may have blotches of a darker colouration applied thereto at selected areas for the same purpose.

When a picture is projected on to the composite screen and viewed from the front thereof, there is created an illusion of depth and stereoscopicity due to the main and brightest reflection from the front screen surface being backed up by a plurality of subsidiary and dimmer reflections from the intermediate and final screen surfaces, these subsidiary reflections being spaced out behind the main reflection and diffused somewhat by their passage through the front screen surface.

Composite screens according to the invention may be utilized for the projection of both black-and-white and coloured pictures. In this connection it may be pointed out that "black and white" pictures when thus projected may appear to be tinted as viewed on the screen, due to the character of the reflections from the coloured screen surfaces, whilst coloured pictures appear to be more naturally coloured. The effects produced may be very pleasing.

Figure 2:
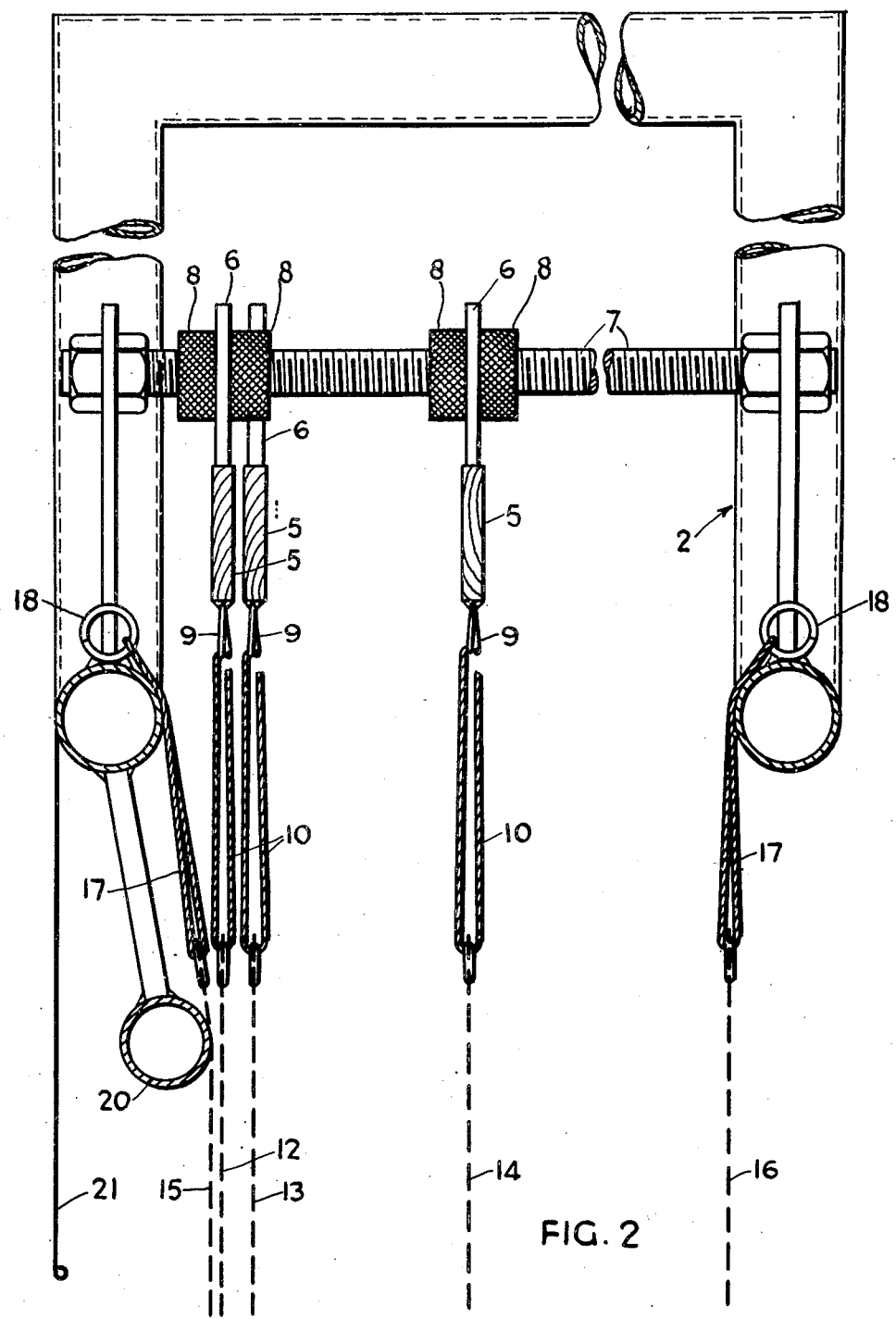
Figure 3:
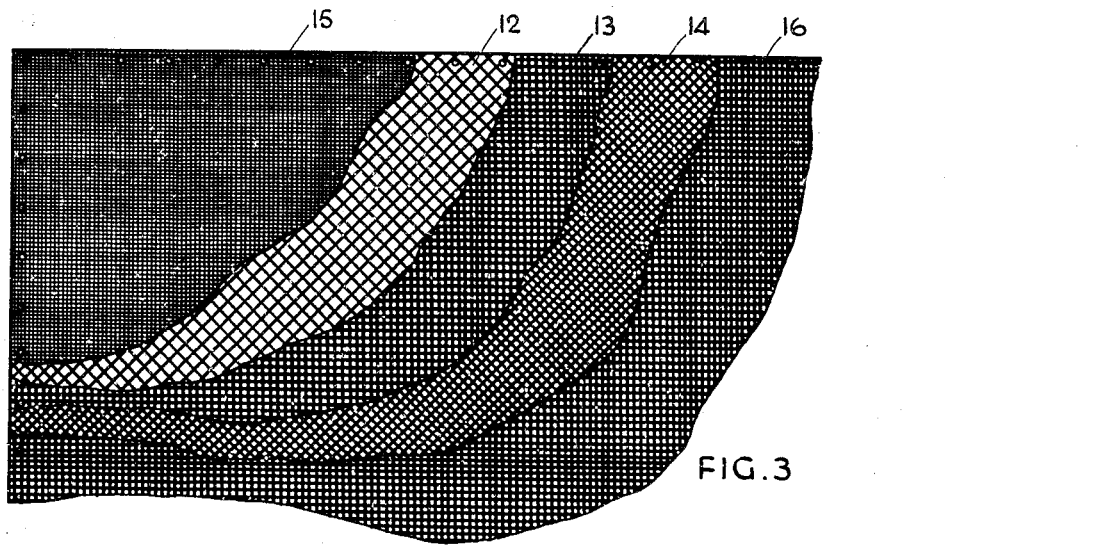
Figure 4:
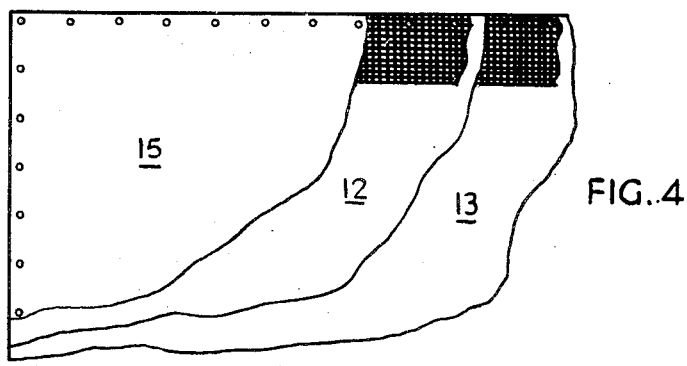
Figure 5:
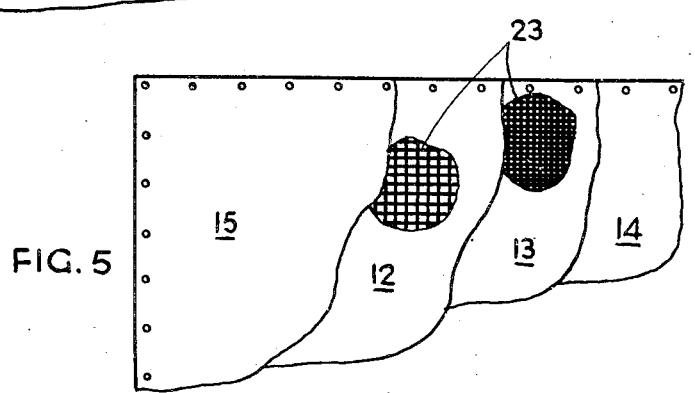

Some practical constructions of the composite screens according to the invention are illustrated by way of example in the accompanying drawings, wherein:

Fig. 1A is a perspective view of the left hand end of a suitable frame, with parts broken away, for mounting the composite screen of which parts of the front screen surface only are shown, Fig. 1B is a similar view of the right hand end of the frame, Fig. 2 is a section taken on the line II—II of Fig. 1, Fig. 3 is a fragmentary front elevation of a composite screen without its supporting frame, Fig. 4 is a similar view showing a modification, and Fig. 5 is a similar view illustrating yet another modification.

As can be seen from Figs. 1 and 2, the composite screen according to the invention may be supported in a rectangular frame composed of suitably braced tubular structures 1, 2, 3 and 4. Carried from these structures are framing strips 5 which may initially be set at predetermined spacings to agree with the desired spacings of the respective screen surfaces of the composite screen or, as shown in Fig. 2, may be adjustably mounted by eyes 6 on threaded rods 7. In the latter case the eyes are locked in position by nuts 8 threaded on the rods 7 which latter may be staggered where it is necessary to accommodate very closely spaced screen surfaces (see the second and third screen surfaces in Fig. 2).

The framing strips 5 carry at regular intervals along their inner edges the usual lacing hooks 9 for engagement by lacings 10 that are threaded through eyelets 11 secured along the edges of the intermediate screen surfaces 12, 13 and 14. The front and rear screen surfaces 15 and 16, respectively, are similarly laced at 17 to rings 19 secured on the tubular structures 1, 2, 3, 4. A perfectly plane surface to the front screen surface 15 is ensured by providing stretcher members 20 of tubular form supported from the tubular structures to constitute a rectangular frame. The stretcher members are preferably masked from view by means of a border 21 of black material.

The apparatus or structure for supporting the screen surfaces is not part of this invention and has not, therefore, been described in detail.

Referring now to Fig. 3, there are indicated a front screen surface 15 of close mesh fine-thread woven material, a second screen surface 12 of a woven material of a coarser texture, third and fourth screen surfaces, 13 and 14, of a woven material of a texture similar to that of the second screen surface, and the final screen surface 16 which may be of woven material of a relatively coarse texture or a foraminous sheet of white material. The front surface 15 is white, the second surface 12 is yellowish-green, the third screen surface 13 is blue-green, and the fourth screen surface 14 is red. As can be seen from Fig. 2, the second surface 12 is disposed very close to the front surface 15 whereas the third surface 13 is disposed a somewhat greater distance from the second surface 12 than separates surfaces 15 and 12. The surface 14 is spaced a relatively large amount from the third surface 13 and the final surface 16 is spaced at least as far from the surface 14 as the latter is from the surface 13.

Fig. 4 illustrates the use of strips 22 of coarse woven material at the margins of and between the main screen surfaces 15, 12 and 13. Such strips may have irregularly shaped edges and may be disposed at the sides or foot of the composite screen, if desired.

Fig. 5 shows another modification in which blotches 23 of a darker colouration are applied to the intermediate screen surfaces 12 and 13, for the purposes set forth above. These blotches may obviously be arranged at locations other than those shown in the drawing.

What I claim is:

1. A composite projection screen comprising a front screen surface composed of a network of closely spaced fine substantially white filaments, a second screen surface disposed parallel with and closely adjacent the said front surface and composed of a network of filaments which are coloured to a light shade of green and are of greater thickness and less closely spaced than the filaments of the said front surface, a third screen surface disposed parallel with the said second screen surface and spaced therefrom by a greater distance than that between the said front and second screen surfaces and composed of a network of filaments which are coloured to a darker shade of green than the colouring of the filaments of said second screen surface, the filaments of said third screen surface being of greater thickness and less closely spaced than the filaments of the said front surface, and a final white screen surface disposed parallel with the said third screen surface but spaced therefrom by a distance at least as great as that between said second and third screen surfaces.

2. In a composite projection screen comprising a plurality of parallel partly transparent screen surfaces each composed of a network of filaments, the combination of a front surface composed of closely spaced fine substantially white filaments, a second surface composed of yellowish-green filaments of greater thickness and less closely spaced than the filaments of the said front surface and disposed close to the latter, a third surface composed of blue-green filaments of approximately the same thickness and spacing as those of the said second surface and spaced from the latter by a distance greater than that between the said front and second surfaces, and a final surface composed of white filaments of approximately the same thickness and spacing as those of the third surface and spaced from the latter by a distance at least as great as that between the said second and third surfaces.

3. In a composite projection screen as claimed in claim 1 an additional screen surface composed of medium-red filaments of the same character as those of the said third surface and disposed between the latter and the said final surface.

MATTHEW A. RENISON.

REFERENCES CITED

The following references are of record in the file of this patent:

UNITED STATES PATENTS

| Number | Name | Date |
| --- | --- | --- |
| 1,104,407 | Cary | July 21, 1914 |
| 1,260,221 | McCormick | Mar. 19, 1918 |
| 1,411,661 | Hurd | Apr. 4, 1922 |
| 1,650,341 | Goldstein | Nov. 22, 1927 |
| 1,686,880 | Shay | Oct. 9, 1928 |
| 1,917,246 | Faris | July 11, 1933 |
| 1,995,964 | Darimont | Mar. 26, 1935 |

FOREIGN PATENTS

| Number | Country | Date |
| --- | --- | --- |
| 567,372 | France | Dec. 5, 1923 |
| 737,550 | France | Oct. 4, 1932 |